United States Patent
Sun

(10) Patent No.: US 10,081,007 B2
(45) Date of Patent: Sep. 25, 2018

(54) POLYMERIC COMPLEX SUPPORTER WITH ZERO-VALENT METALS AND MANUFACTURING METHOD THEREOF

(71) Applicant: GeoNano Environmental Technology, INC., Pingtung (TW)

(72) Inventor: Yuan-Pang Sun, Pingtung County (TW)

(73) Assignee: GeoNano Environmental Technology, INC., Pingtung (TW)

( * ) Notice: Subject to any disclaimer, the term of this patent is extended or adjusted under 35 U.S.C. 154(b) by 230 days.

(21) Appl. No.: 14/831,888

(22) Filed: Aug. 21, 2015

(65) Prior Publication Data

US 2015/0352527 A1    Dec. 10, 2015

Related U.S. Application Data

(62) Division of application No. 13/606,043, filed on Sep. 7, 2012, now abandoned.

(30) Foreign Application Priority Data

Sep. 8, 2011   (TW) .............................. 100132459 A

(51) Int. Cl.
  *B01J 23/745*   (2006.01)
  *B01J 20/30*    (2006.01)
  (Continued)

(52) U.S. Cl.
  CPC ............. *B01J 23/745* (2013.01); *B01J 20/02* (2013.01); *B01J 20/18* (2013.01); *B01J 20/20* (2013.01);
  (Continued)

(58) Field of Classification Search
  CPC .... B01J 23/745; B01J 20/3007; B01J 35/026; B01J 35/02; B01J 23/8906; B01J 37/0215;
  (Continued)

(56) References Cited

U.S. PATENT DOCUMENTS

| 6,242,663 B1 * | 6/2001 | Ponder .................... B09C 1/002 588/315 |
| 2002/0056687 A1 | 5/2002 | Pimenov et al. |

(Continued)

OTHER PUBLICATIONS

Evrim Celik, Hosik Park, Hyeongyu Choi, Heechiul Choi, Carbon, Carbon nanotube blended polyethersulfone membranes for fouling control in water treatment, Water Research 45(2011)274-282.

*Primary Examiner* — Peter F Godenschwager
*Assistant Examiner* — Andrew J. Oyer
(74) *Attorney, Agent, or Firm* — CKC & Partners Co., Ltd.

(57) ABSTRACT

A zero-valent metal polymeric complex supporter (ZVM-PCS) is disclosed. PCS possesses porous surface and internal coralloid-like channel structure that can accommodate high amount of iron-containing materials and derivatives thereof. The surface pore size, porosity, hydrophilicity and internal coralloid-like channel structure of PCS can be tailored through the manufacturing process, with which PCS can be functioned as a regulator for the releasing of produced hydrogen, and also control the adsorption and reactions toward heavy metals and chlorinated volatile organic compounds in water. The released hydrogen from the ZVM-PCS can be applied to anaerobic bioremediation. Moreover, the ZVM-PCS can be developed as the filter materials that can be installed in a column or any storage for water and wastewater treatment, or even in a groundwater cut-off barrier for the cleanup of contamination. While the ZVM- (Continued)

PCS is synthesized as a film without openings, it can be used as the electromagnetic interference shielding material.

13 Claims, 10 Drawing Sheets

(51) Int. Cl.

| | |
|---|---|
| *B01J 35/02* | (2006.01) |
| *B01J 23/89* | (2006.01) |
| *B01J 37/00* | (2006.01) |
| *B05D 1/00* | (2006.01) |
| *C01B 3/06* | (2006.01) |
| *B01J 20/28* | (2006.01) |
| *B01J 20/18* | (2006.01) |
| *C01F 1/00* | (2006.01) |
| *B01J 37/04* | (2006.01) |
| *B01J 37/02* | (2006.01) |
| *B01J 20/02* | (2006.01) |
| *B01J 20/20* | (2006.01) |
| *B01J 20/26* | (2006.01) |
| *B01J 20/32* | (2006.01) |
| *C02F 1/00* | (2006.01) |
| *C02F 1/28* | (2006.01) |
| *C02F 1/70* | (2006.01) |
| *C02F 101/20* | (2006.01) |
| *C02F 101/30* | (2006.01) |
| *C02F 101/32* | (2006.01) |
| *C02F 101/36* | (2006.01) |

(52) U.S. Cl.
CPC ....... *B01J 20/262* (2013.01); *B01J 20/28021* (2013.01); *B01J 20/28026* (2013.01); *B01J 20/3007* (2013.01); *B01J 20/3085* (2013.01); *B01J 20/3291* (2013.01); *B01J 23/8906* (2013.01); *B01J 35/02* (2013.01); *B01J 35/026* (2013.01); *B01J 37/009* (2013.01); *B01J 37/0215* (2013.01); *B01J 37/04* (2013.01); *B05D 1/005* (2013.01); *C01B 3/06* (2013.01); *B01J 2220/46* (2013.01); *C02F 1/001* (2013.01); *C02F 1/285* (2013.01); *C02F 1/70* (2013.01); *C02F 2101/20* (2013.01); *C02F 2101/306* (2013.01); *C02F 2101/322* (2013.01); *C02F 2101/36* (2013.01); *C02F 2305/08* (2013.01); *Y02E 60/36* (2013.01)

(58) Field of Classification Search
CPC . B01J 37/009; B01J 37/04; B01J 20/02; B01J 20/28021; B01J 20/28026; B01J 20/3291; B01J 20/3085; B01J 20/262; B01J 20/20; B01J 20/18; B05D 1/005; C01B 3/06
See application file for complete search history.

(56) References Cited

U.S. PATENT DOCUMENTS

| | | |
|---|---|---|
| 2003/0134409 A1 | 7/2003 | Mallouk et al. |
| 2003/0150808 A1 | 8/2003 | Morikawa et al. |
| 2007/0088114 A1 | 4/2007 | Asgari |
| 2009/0127208 A1 | 5/2009 | Berkowitz et al. |

\* cited by examiner

POLYMERIC COMPLEX SUPPORTER WITH ZERO-VALENT METALS AND MANUFACTURING METHOD THEREOF

RELATED APPLICATIONS

The present application is a divisional application of U.S. application Ser. No. 13/606,043, filed Sep. 7, 2012, which is herein incorporated by reference, which was based on, and claims priority from, Taiwan Application Serial Number 100132459, filed Sep. 8, 2011, the entire disclosures of which are hereby incorporated by reference in their entireties.

FIELD OF THE INVENTION

This invention generally relates to a polymeric complex supporter (PCS) with zero-valent metals and a method for manufacturing the same, and more particularly, to a PCS comprising iron-containing materials and derivatives thereof and a method for manufacturing the same, which can be applied on pollution remediation and electromagnetic interference shielding.

BACKGROUND OF THE INVENTION

It has been proved by many related researches since 1990s that micro or nano scale zero-valent iron (ZVI) is a very effective material for soil and groundwater remediation. Contaminants such as chlorinated volatile organic compounds, heavy metals, pesticides, PCBs and dioxins can be degraded by ZVI. Nano-scale ZVI can react faster due to smaller particle size and larger surface area. However, the bare nanoscale ZVI is also easy to be corroded, which thus shortens its longevity. Currently, ZVI's applications are still restricted in the groundwater environment where is a hypoxic or anoxic condition. It is barely seen that ZVI is applied to water or wastewater treatment system that might be due to the higher cost, higher water chroma and turbidity, difficult recycling and separation, and so on. On the other hand, ZVI has the characteristics of hydrogen production and magnetism, which is not yet fully developed.

Zero-valent metals (ZVMs), for example, ZVI ($Fe^0$), zero-valent zinc ($Zn^0$) and zero-valent aluminum ($Al^0$), have excellent reduction ability to decompose water and generate hydrogen. For the commonly-used slurry type of ZVM, the generated hydrogen is usually mixed with ZVM powders in the slurry and thus is hard to be used more efficiently. Moreover, ZVM powders relatively have more surface areas exposed to air, that may shorten the longevity and increase the cost.

It has been shown that the ZVM powders can be coated with organic substances (for example, polymers and surfactants) or inorganic substances (for example, silicon dioxide and titanium dioxide) to slow down the corrosion rate and to increase reaction rate. However, that still cannot extend the ZVM materials into various application fields.

Therefore, it should be necessary to provide a better method for manufacturing zero-valent metals, which strengthens the original features and produces more industrial applications of ZVMs.

SUMMARY OF THE INVENTION

Accordingly, an aspect of the present invention provides a zerovalent metal-polymer complex supporter (ZVM-PCS) that can accommodate high amount (up to approximately 92 parts by weight) of iron-containing materials and derivatives thereof and control the hydrogen-releasing rate. The surface pore size, porosity, hydrophilicity, and internal coralloid-like channel structure of PCS can be tailored through the manufacturing process, so that PCS can be functioned as a regulator for the release of produced hydrogen, and also control the adsorption and reactions toward heavy metals and chlorinated volatile organic compounds in water. The released hydrogen from the ZVM-PCS thus provides the required gas for metabolism of anaerobic microbes. Moreover, the ZVM-PCS can be applied to filter materials of water and wastewater treatment and cut-off walls of groundwater pollution remediation, thereby adsorbing heavy metals and catalyzing reduction reactions of chlorinated volatile organic compounds.

Another aspect of the present invention provides a method for manufacturing ZVM-PCS, which is combined with both wet- and dry-forming and functionalizing step of the PCS. Iron-containing materials and derivatives thereof are embedded into a three-dimensional internal space in the PCS. The surface pore size, porosity, hydrophilicity, and internal coralloid-like channel structure of the PCS can be tailored, with which PCS can be functioned as a regulator for controlling the hydrogen-released rate of the iron-containing materials and derivatives thereof.

A still another aspect of the present invention provides a method for manufacturing ZVM-PCS, which includes a dry-forming and functionalizing step for iron-containing materials and derivatives thereof to be embedded into a three-dimensional internal space in PCS, so as to form a ZVM-PCS which is flexible and has a dense structure without surface openings.

A further aspect of the present invention provides a ZVM-PCS that is manufactured by the above-described method. The ZVM-PCS is flexible and has a dense nonporous structure that can be used as the electromagnetic interference (EMI) shielding material.

According to the aforementioned aspect of the present invention, ZVM-PCS is disclosed. In an embodiment, PCS may include but not limited to 1 part to 92 parts by weight of iron-containing materials and derivatives thereof and 8 parts to 99 parts by weight of polymers. As the ZVM-PCS is immersed in a water-containing environment, water molecules diffuse into the internal coralloid-like channel structure through surface pores and then react with the iron-containing materials and derivatives thereof. The generated hydrogen can be continuously released out through surface pores to promote microbial growth, and adsorption and/or degradation of pollutants in water.

In a preferred embodiment, the aforementioned iron-containing materials and derivatives thereof may include zero-valent irons ($Fe^0$) that may have an averaged diameter from 1 nanometer (nm) to 10 micrometers (μm).

In a preferred embodiment, the aforementioned ZVM-PCS may possess an internal coralloid-like channel structure and surface pores disposed thereon. The surface pores may have an averaged pore size from 1 nm to 100 μm, for example.

In a preferred embodiment, the polymeric complexes may be sulfone polymers or fluorine-containing polymers.

In a preferred embodiment, the aforementioned ZVM-PCS may further include an absorbing material, a heat dispersing material, and/or a bionutrient except for iron-containing materials and derivatives thereof.

In a preferred embodiment, the water-containing environment may refer to ocean, river, lake, sewerage, ditch, aquifer, cistern, sludge or soil.

According to the another aspect of the present invention, a method for manufacturing ZVM-PCS is disclosed. In an embodiment, the method can include the following steps. First, a mixture is prepared, which can include but not limited to 1 part to 92 parts by weight of iron-containing materials and derivatives thereof, 8 parts to 99 parts by weight of polymers, and an organic solvent. Next, vacuuming may be performed to remove air bubbles in the mixture. Afterward, the mixture is subjected to a forming and functionalizing step that may include but be not limited to a wet-forming and functionalizing step and a dry-forming and functionalizing step, so as to form the ZVM-PCS that accommodates the iron-containing materials and derivatives thereof. The resulted ZVM-PCS has an internal coralloid-like channel structure with a porous surface with tunable pore sizes from 1 nm to 100 μm. As the ZVM-PCS is immersed in a water-containing environment, water molecules diffuse into the internal coralloid-like channel structure through the surface pores and then react with iron-containing materials and derivatives thereof. The produced hydrogen may be continuously released out through the surface pores of PCS, and promote microbial growth and adsorption and/or degradation of pollutants in water. In a preferred embodiment, the ZVM-PCS may be shaped as various types, such as plate (e.g. flake or thin film), granule, hollow tube, rod or other solid types, depending on the demand of applications.

In a preferred embodiment, the method for manufacturing ZVM-PCS may be performed in a batch process or an automatically continuous process.

According to the still another aspect of the present invention, a method for manufacturing ZVM-PCS is disclosed. In an embodiment, the method can include the following steps. Firstly, a mixture is prepared, which can include but be not limited to 1 part to 92 parts by weight of iron-containing materials and derivatives thereof, 8 parts to 99 parts by weight of polymers, and an organic solvent, so as to dissolve polymers and evenly disperse the iron-containing materials and derivatives thereof. Next, vacuuming may be performed to remove air bubbles in the mixture. Afterward, a dry forming and functionalizing step may be performed to form the ZVM-PCS. The resulted ZVM-PCS that accommodates the iron-containing materials and derivatives thereof is flexible and has a dense non-porous structure.

According to the further aspect of the present invention, an electromagnetic interference (EMI) shielding material is provided, which is synthesized by the aforementioned method. The EMI shielding material is flexible and has a dense non-porous structure for effectively shielding electromagnetic waves.

In application of the aforementioned ZVM-PCS and manufacturing method thereof, the ZVM-PCS has tunable surface pore sizes, porosity, affinity toward water and the internal coralloid-like channel structure, so as to accommodate high amount of iron-containing materials and derivatives thereof. The PCS can be functioned as a regulator for the hydrogen-releasing rate of the reaction with the ZVM-PCS and water, and also control the adsorption rate and reduction rate toward heavy metals and chlorinated volatile organic compounds in water. Therefore, the released hydrogen from the ZVM-PCS provides the requirement for metabolism of anaerobic microbes. Also, the ZVM-PCS can be applied to wastewater filtration materials and cut-off walls of groundwater pollution remediation for adsorption of heavy metals and catalysis of reduction reactions of chlorinated volatile organic compounds. Furthermore, while the ZVM-PCS is formed to a poreless film as the EMI shielding material.

BRIEF DESCRIPTION OF THE DRAWINGS

The foregoing aspects and many of the attendant advantages of this invention are more readily appreciated as the same become better understood by reference to the following detailed description in conjunction with the accompanying drawing, wherein.

DETAILED DESCRIPTION OF THE PREFERRED EMBODIMENT

Figure 1:
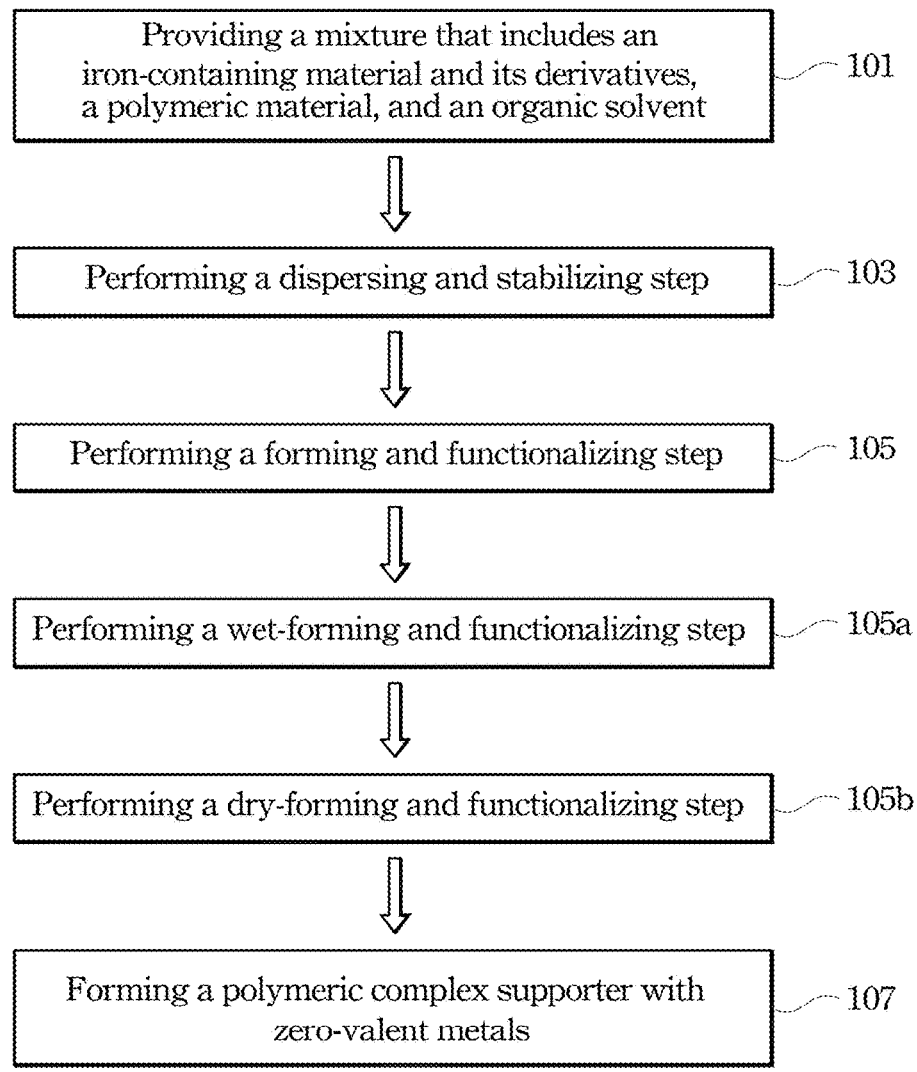
FIG. 1 depicts a partial flow chart of a method for manufacturing the ZVM-PCS according to an embodiment of the present invention.

Accordingly, the present invention provides a polymeric complex supporter (PCS) with zero-valent metals (ZVI-PCS) and a manufacturing method thereof, in which the PCS can accommodate high amount of iron-containing materials and derivatives thereof in its internal coralloid-like channel structure, so as to form the ZVI-PCS.

The "ZVI-PCS" described in the present invention refers to the PCS that accommodates iron-containing materials and derivatives thereof. The surface pore size, porosity, the internal coralloid-like channel structure and affinity toward water of the PCS can be tunable, thereby continuously and stably releasing hydrogen gas generated from the reaction of iron-containing materials and derivatives thereof with water for a long period. Therefore, ZVI-PCS can be used to facilitate the growth of anaerobes, and the iron-containing materials and their derivatives can absorb and degrade pollutants. In an embodiment, the ZVI-PCS can accommodate high amount of hydrogen-releasing materials and derivatives thereof in the spacious structure.

"The internal coralloid-like channel structure" described in the present invention refers to the structure in PCS. The internal coralloid-like channel structure is constructed by polymeric connections, where the diffusion of water and hydrogen molecules is constrained so that the produced hydrogen can be continuously released for a long time.

"The iron-containing materials and derivatives thereof" described in the present invention refers to the substance that can release hydrogen after contacting and reacting with water, also called hydrogen-releasing substance or hydrogen-generating substance. The iron-containing materials and derivatives thereof can contribute to the growth of anaerobes, absorb and/or degrade pollutants. Also, the hydrogen-releasing rate of iron-containing materials and derivatives thereof depends on their particle size, for example, having 1 nm to 100 μm of the averaged diameter.

In an embodiment, iron-containing materials and derivatives thereof may include zero-valent iron (ZVI, $Fe^0$) particles. In an example, the ZVI may be commercially available product that is either purified or contains impurities. As the ZVI contacts and reacts with water, hydrogen gas is then generated according to the following reaction formula (I), so as to facilitate growth of anaerobes, to absorb and/or to degrade pollutants. Therefore, the ZVI-PCS also provides many functions as aforementioned.

$$Fe^0+2H_2O \rightarrow Fe^{2+}+H_2+2OH^- \qquad (I)$$

As the above description, the PCS can accommodate high amount of iron-containing materials and derivatives thereof. As the ZVI-PCS is immersed in a water-containing environment, the higher high specific surface area of the ZVI-PCS provides for quick diffusion of water molecules and pollutants into the surface pores and the internal coralloid-like channel structure, for being absorbed and degraded by the iron-containing materials and derivatives thereof. The carrier's structure can control and constrain the generation of the hydrogen gas, so that the hydrogen gas can be continuously released out and beneficial to anaerobic bioremediation.

"The water-containing environment" refers to all water-containing environments, which may include but be not limited to ocean, river, lake, sewerage, ditch, aquifer, cistern, sludge, soil or the likes. According to an embodiment, the ZVI-PCS provides some tunable properties, such as the usage and averaged particle size of the iron-containing materials and derivatives thereof, the surface pore size, porosity, internal coralloid-like channel structure and affinity toward water of the PCS, for strengthening the absorption and reaction of ZVI-PCS to pollutants as well as continuously releasing gas for a long period.

In addition, for producing the catalytic or magnetic effect of ZVIs, metals, for example, platinum, palladium, rhodium, gold, silver, cobalt or any combination thereof, can be coated onto the ZVIs.

The iron-containing materials and derivatives thereof can absorb and/or degrade "pollutants". The "pollutants" described in the present invention refers to heavy metal pollutants, organohalogen compounds or nitrates. In an embodiment, the heavy metal pollutants may include but be not limited to arsenic, molybdenum or chromium. The organohalogen compounds may include but be not limited to chlorinated volatile organic compounds (CVOCs), trichloroethylene (TCE), perchloroethylene (PCE) or dioxins.

In an embodiment, the ZVI-PCS can accommodate more amounts of iron-containing materials and its derivatives. In an example, the ZVI-PCS may be formed by mixing 8 parts to 99 parts by weight of polymers and 1 part to 92 parts by weight of iron-containing materials and derivatives thereof. In another example, the ZVI-PCS may be formed by mixing 8 parts to 95 parts by weight of polymers and 5 parts to 92 parts by weight of iron-containing materials and derivatives thereof. In a further example, ZVI-PCS may be formed by mixing 8 parts to 50 parts by weight of polymers and 50 parts to 92 parts by weight of iron-containing materials and derivatives thereof.

In another embodiment, iron-containing materials and derivatives thereof may have an averaged pore size from 1 nm to 10 μm. The PCS may have an internal coralloid-like channel structure and a plurality of surface pores with an averaged pore size from 1 nm to 100 μm for accommodating more amounts (for example, up to 92 parts by weight) of iron-containing materials and derivatives thereof. Moreover, depending on actual requirements, the PCS can be made by using hydrophilic polymeric materials, hydrophobic polymeric materials or any combination thereof, so as to control the PCS's affinity toward water. In an example, the aforementioned polymeric materials may be sulfone polymers or fluorine-containing polymers. The sulfone polymers may include but be not limited to polyethersulfone (PESF), polysulfone (PSF) or polyphenylene sulfone (PPSF). The fluorine-containing polymers may include polyvinylidene fluoride (PVDF).

In a further embodiment, the ZVI-PCS may optionally include other absorbent materials, heat dispersing materials and/or bionutrients for increasing more functions. The usage of the absorbent materials, heat dispersing materials and/or bionutrients in ZVI-PCS is 0.01 part to 35 parts by weight respectively based on the total weight of the iron-containing materials and derivatives thereof and the PCS. In an example, the absorbent materials may include but be not limited to activated carbon, zeolite, molecular sieve or any combination thereof. In another example, the heat dispersing materials may include but be not limited to boron nitride, carbon nanotubes or any combination thereof. In a further example, the bionutrients may include but be not limited to sugar, starch or any combination thereof. The additions may also enhance the growth of microorganisms in the water-containing environment.

In a further embodiment, the ZVI-PCS can be synthesized as a film without surface openings, which accommodate high amount of iron-containing materials and derivatives thereof. Therefore, it can be used as an EMI shielding material. In one example, the film may be optionally added the heat dispersing materials for increasing more functions.

In a still another embodiment, ZVI-PCS may be manufactured as follows. Reference is made to FIG. 1, which depicts a partial flow chart of a method for manufacturing ZVI-PCS according to an embodiment of the present invention. In an example, a mixture is firstly prepared, for example, including 1 part to 92 parts by weight of the iron-containing materials and derivatives thereof, 8 parts to 99 parts by weight of the polymers and an organic solvent as shown in the step 101. The polymers can be dissolved and the iron-containing materials and derivatives thereof can be dispersed in the organic solvent. In this example, the polymers may be exemplified as the aforementioned materials. The organic solvent may include but be not limited to N,N-dimethyl formamide (DMF), 1-methyl 2 pyrrolidione (NMP) and N, N-dimethylacetamide (DMAc). In another example, the iron-containing materials and derivatives thereof and polymers may be different contents of parts by weight beyond aforementioned in the mixture without being recited in detail herein. In a further example, the mixture may optionally include absorbent materials, heat dispersing materials and/or bionutrients as aforementioned.

Following, a dispersion and stabilization step may be optionally performed as shown in the step 103, in which the dispersant may be added and mixed at a stirring speed from 50 revolutions per minute (rpm) to 500 rpm for 6 hours and 24 hours approximately until the mixture is evenly and stably dispersed without immediate sedimentation. Thus, the iron-containing materials are evenly dispersed in the resulted ZVI-PCS, and the PCS has smooth surface and uniform color. In an example, the dispersants may include organic polymeric dispersants such as polycarboxylate, polyvinyl alcohol, polyacrylamide or any combination thereof. In another example, an amount of the dispersant may be 0.1 parts to 2 parts by weight based on the total weight of the iron-containing materials and derivatives thereof and the PCS. It should be noted that, the organic polymeric dispersant may further include other dispersants having the same or similar ingredients therein, such as commercially availible dispersants of Hypermer™ KD-1, KD-2, KD-3, KD-4, KD-6, KD-7 and KD-9 manufactured by Croda International Plc. England without being limited to the above examples. Next, a vacuuming step may be carried out to remove air bubbles in the mixture.

Afterward, a formation and functionalizing step may be performed as shown in the step 105, in which the forming and functionalizing step may include but be not limited to a wet-forming and functionalizing step (as shown in the step 105*a*) and a dry-forming and functionalizing step (as shown in the step 105*b*), so as to make the mixture to form the ZVI-PCS that the iron-containing materials and derivatives thereof are completely received in the PCS.

In detail, in an embodiment, during performing the wet-forming and functionalizing step (as shown in the step 105*a*), the mixture may be swollen in a coagulant under a temperature of 0° C. to 40° C. for 0.5 minute to 5 minutes, for example, so as to partially remove the organic solvent and the coagulant and to form a composite material. In an example, the wet-forming and functionalizing step may be performed under a temperature of 5° C. to 15° C. In another example, an appropriate coagulant solvent may include but be not limited to methanol, ethanol, propanol, acetone, water or any combination thereof. In this embodiment, for the purpose of formation of the composite materials with various shapes, many conventional methods can be applied to form the composite material having various shapes such as plates (or flakes or films), granules, hollow tubes or bars. Those methods and shapes are well known to the artisan in this art rather than being recited in detail herein.

Figure 2:
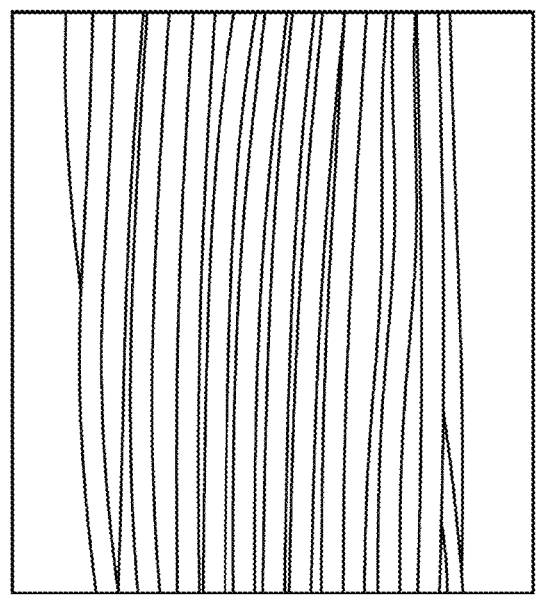
FIG. 2 shows a hollow tube-like shape of the ZVI-PCS according to an embodiment of the present invention.

In another embodiment, during performing the dry-forming and functionalizing step (as shown in the step 105*b*), the resulted composite material is dried under a temperature of 90° C. to 150° C. for 15 minutes to 30 minutes, for example, so as to remove the residual organic solvent and to form the PCS-iron, as shown in the step 107. In an example, the dry-forming and functionalizing step may be performed in a temperature of 100° C. to 120° C. In another example, the resulted PCS-iron may be formed in various shapes such as plates (or flakes or films), granules, hollow tubes or bars. For example, FIG. 2 shows an appearance of hollow tube-shaped ZVI-PCS according to an embodiment of the present invention. In a further example, the resulted ZVI-PCS may have a thickness of 1 μm to 1000 μm, for example. In a still another example, the resulted ZVI-PCS may have a thickness of 50 μm to 500 μm, for example.

The ZVI-PCS can be formed either alone as aforementioned or in combination with a substrate as follows. Optionally, before preceding the forming and functionalizing step (as shown in the step 105), the mixture can be uniformly coated onto the substrate by a suitably coating method, in which various coating methods can be utilized in this coating step depending on different substrates. In an embodiment, the coating method may be a blade coating or spin-on coating if the substrate is a plate (or a flake or a film). In another embodiment, the substrate may be immersed into and coated with the mixture uniformly if the substrate is a granule, a hollow tube or a bar, thereby forming the mixture uniformly on the surface of the substrate.

Figure 3A:
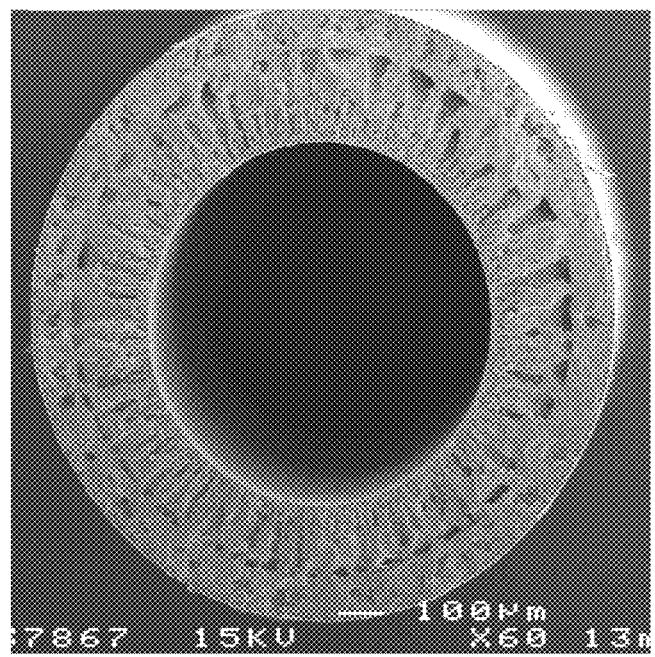
FIGS. 3A to 3C show the photographs of cross-sectional (FIG. 3A), internal (FIG. 3B) and superficial structures (FIG. 3C) of the ZVI-PCS according to several embodiments of the present invention.
Figure 3B:
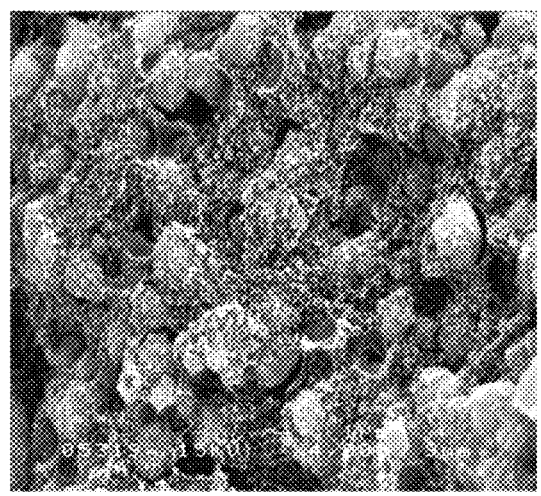
Figure 3C:
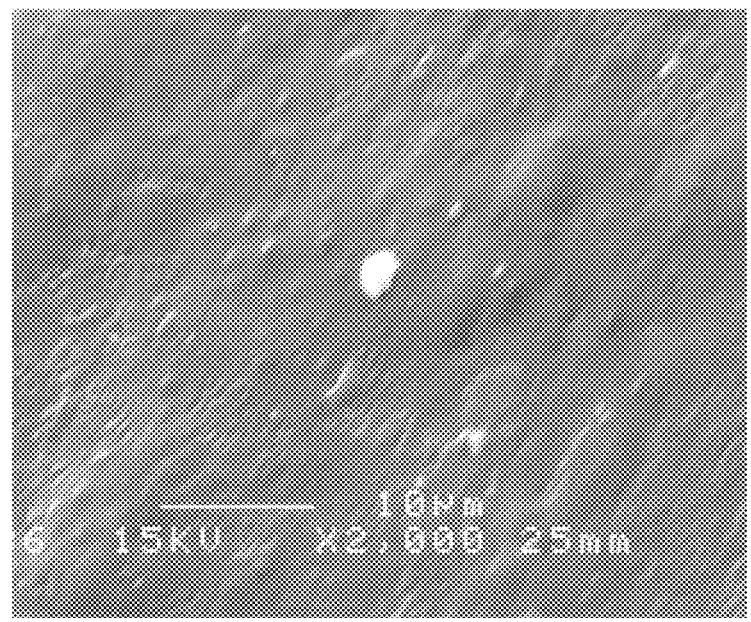

It is worth mentioning that, the aforementioned steps can be performed in a batch process or an automatically continuous process depending on the requirements of the process. For example, reference is made to FIGS. 3A to 3C, which show the photographs of cross-sectional (FIG. 3A), internal (FIG. 3B) and superficial (FIG. 3C) structures of the ZVI-PCS according to several embodiments of the present invention. Through the above processes, the aforementioned ZVI-PCS produced by those steps is well-functionalized, in which it has an internal coralloid-like channel structure (as shown in FIG. 3A), surface pores (as shown in FIG. 3B) with an averaged pore size of 1 nm to 100 μm.

In an embodiment, the ZVI-PCS, which is exemplified as a plate-like ZVI-PCS, a flake-like ZVI-PCS, a film-like ZVI-PCS, or a plate-like substrate coated with the ZVI-PCS, is immersed in a water-containing environment such as an ocean, a river, a lake, a sewerage, a ditch, an aquifer, a cistern, sludge or soil. In addition, the plate-like ZVI-PCS, the flake-like ZVI-PCS, the film-like ZVI-PCS, the bar-like ZVI-PCS or those various shapes of the substrate coated with the ZVI-PCS can be mixed well with soil. And then, water molecules and pollutants diffuse into the internal coralloid-like channel structure through the pores and then contact with iron-containing materials and derivatives thereof in the ZVI-PCS, so as to absorb and/or degrade the pollutants, continuously and stably release hydrogen in the outside the ZVI-PCS, thereby enhancing the growth of microbes in the water-containing environment.

In another embodiment, the ZVI-PCS, which may be formed either alone as aforementioned or in combination with the substrate coated with ZVI-PCS can be made into a barrier wall, for example, a permeable reactive barrier (PRB), so as to in situ degrade contaminants which are passed through the PRB.

"The PRB" manufactured by the ZVI-PCS as described herein is referred to a PRB disposed along a cross-section of a flowing direction of a plume of contaminants in the contaminated underground environment. The PRB can be either a replaceable column established by using a well driller, or the PRB established by digging ditches. The plume of contaminants can be captured and/or broke down so as to be remove. Conventional powder columns or the PRBs are inconvenient for construction and replacement due to them fixed beneath the ground. Furthermore, it costs more to build a conventional PRB that usually has a thickness of 2 meters to 3 meters.

Figure 4:
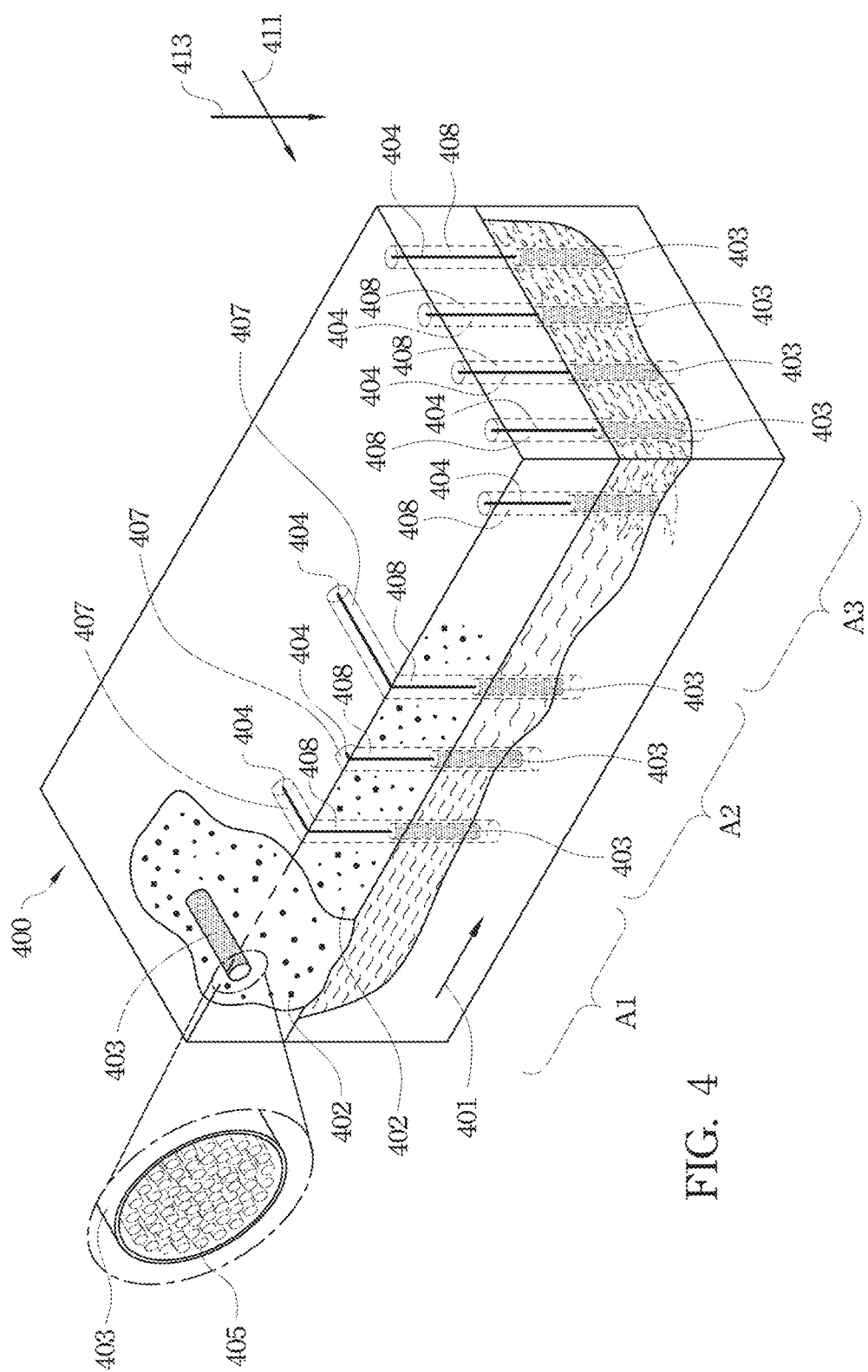
FIG. 4 depicts an application diagram of replaceable columns according to an embodiment of the present invention.

Specifically, reference is made to FIG. 4, which depicts a construction diagram of a replaceable column according to an embodiment of the present invention. In an example, multiple replaceable columns 403 are set up in an underground environment 400 that is contaminated by pollutants 402. The replaceable columns 403 can be established by using different construction methods along a diffusing direction 401 of pollutants 402.

In an example, the replaceable columns 403 can be arranged in a horizontal direction 411 corresponding to the pollutants' 402 diffusion and passed through an underlying environment of a pollutant source zone A1.

In another example, the replaceable columns 403 can be also arranged by using ropes in a vertical direction 413 corresponding to the pollutants' 402 diffusion and passed through a channel 408 below a ditch 407 in an underlying environment of a pollutant diffusion zone A2.

In a further example, the replaceable columns 403 can be further arranged by using ropes in a vertical direction 413 corresponding to the pollutants' 402 diffusion and passed through the channel 408 in an underlying environment of a pollutant diffusion zone A2.

In a still further example, the replaceable columns 403 also can be arranged by using ropes in a vertical direction 413 corresponding to a pollutant peripheral area A3 by using ropes along the vertical direction in the channel 408 to form fences. The replaceable columns 403 can be also arranged by using ropes in a vertical direction 413 corresponding to the pollutants' 402 diffusion and passed through the channel 408 in an underlying environment of the pollutant peripheral area A3, thereby forming fences. Multiple rod-like ZVI-PCS 405 are further disposed in the replaceable columns 403 to absorb and/or degrade pollutants 402 in the contaminated underground environment 400 and release hydrogen continually and stably, thereby promoting the growth of anaerobic microbes in the whole underlying environments contaminated by the pollutants 402.

Figure 5:
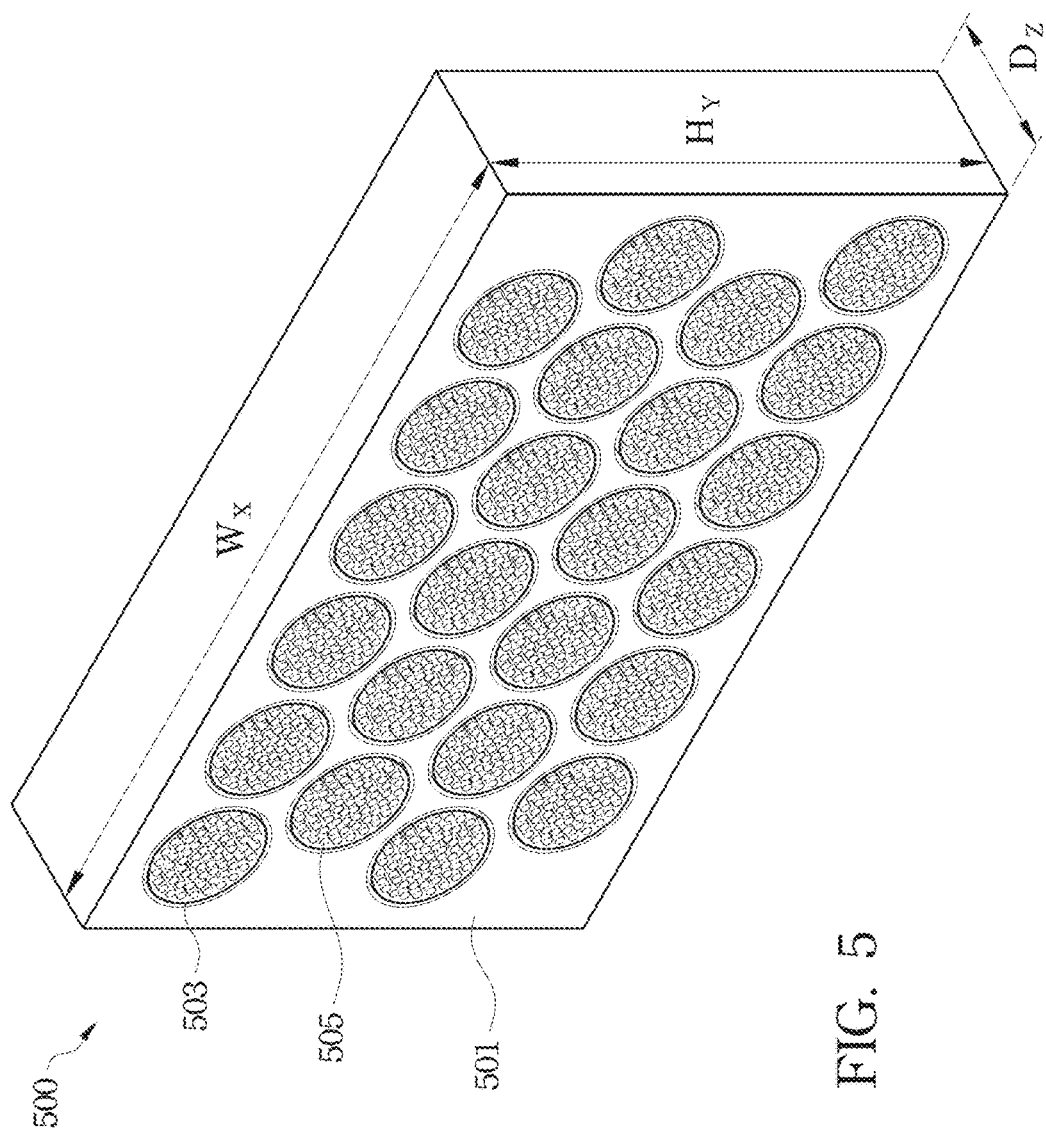
FIG. 5 depicts a diagram of a permeable reactive barrier according to another embodiment of the present invention.

Reference is made to FIG. 5, which depicts a diagram of a PRB according to another embodiment of the present invention. In the actual operation, the ZVI-PCS can be manufactured to a PRB 500. A wall 501 of the PRB 500 can be made of commonly available materials, such as concrete or resin, and the width Wx and height Hy of the wall 501 can be freely adjusted, depending on the actual requirements. The thickness Dz of the wall 501 is very thin, just 10 cm to 30 cm and preferably 10 cm to 15 cm, so that conventionally available facilities such as tracks (unshown) or other equivalent means can be utilized to take out the wall 501 easily for routine replacement or maintenance. In addition, replaceable columns 503 of the PRB 500 can be replaced freely and include multiple bar-like ZVI-PCS 500. Therefore, the PRB 500 of the present invention can improve the shortcomings of the prior PRB such as inconvenient installation, difficult replacement and occupied spaces.

Thereinafter, various applications of the ZVI-PCS will be described in more details referring to several exemplary embodiments below, while not intended to be limited. Thus, one skilled in the art can easily ascertain the essential characteristics of the present invention and, without departing from the spirit and scope thereof, can make various changes and modifications of the invention to adapt it to various usages and conditions.

EXAMPLE 1

Preparation of ZVI-PCS

1. Preparation of Mixture

In this EXAMPLE, 1-methyl 2 pyrrolidione (NMP; 99+% purity, Spectrophotometer Grade, Merck Co., U.S.A.) and polyethersulfone (PESF; Radel A-300, Ameco Performance, U.S.A.) as shown in following TABLE 1 (Experimental Groups) were firstly added into a 500 mL glass bottle, slowly stirred until PESF was completely dissolved. The total volume of NMP and PESF was 50 mL to 400 mL, for example, rather than being limited thereto.

And then, ZVIs (averaged diameter of 20 nm to 10,000 nm approximately, GeoNano Environmental Technology, Inc., Taiwan) was added into the PESF/NMP solution, stirred in with a rotational speed of 500 rpm to 2000 rpm for 2 hours and 24 hours, approximately, thereby evenly dispersing the ZVIs in the PESF/NMP solution and forming a mixture.

TABLE 1

Amounts of Ingredients in the Mixture

| Experimental Groups | PESF/NMP (Weight ratio) | ZVI/PESF (Weight ratio) | Absorbing material, heat dispersing material and/or bionutrients (ZVI + PESF) |
|---|---|---|---|
| 1 | 1/5 | 92/8 | 0.01/100 to 35/100 |
| 2 | 1/5 | 60/40 | |
| 3 | 1/5 | 50/50 | |
| 4 | 1/5 | 25/75 | |
| 5 | 1/5 | 5/95 | |
| Control group | — | 100 | |

Later, a dispersion and stabilization step was performed. In this step, a dispersant such as commercially available dispersants of Hypermer™ KD-1, KD-2, KD-3, KD-4, KD-6, KD-7 and KD-9 manufactured by Croda International Plc. England was added with an amount of 0.1 part to 2 parts by weight based on the total weight of ZVIs and polymers (PESF) into the mixture, and stirred in with a rotational speed of 50 rpm to 500 rpm for 6 hours and 24 hours approximately until the mixture was mixed evenly and stably dispersed without immediate sedimentation. Thus, the iron-containing materials would be evenly dispersed in the ZVI-PCS during a subsequent process, and the resulted PCS would have smooth surface and uniform color.

2. Formation of ZVI-PCS

Following, a forming and functionalizing step was performed. The forming and functionalizing step included but was not limited to a wet-forming and functionalizing step and a dry-forming and functionalizing step, so as to make the mixture to form the ZVI-PCS. In this example, during the wet-forming and functionalizing step, the aforementioned mixture was swollen in a coagulant in a temperature of 0° C. to 40° C. or 5° C. to 15° C. for 0.5 minute to 5 minutes, for example, so as to remove the NMP and the coagulant mostly, thereby forming a composite material. The composite material had a dense surface. The aforementioned coagulant was methanol, ethanol, propanol, acetone, water or any combination thereof.

During the dry-forming and functionalizing course, the swollen composite material was treated under a temperature of 90° C. to 150° C. or 100° C. to 120° C. for 15 minutes to 30 minutes, for example, for removing the residual organic solvent and coagulant and forming a thickness of 1 μm to 1000 μm or 50 μm to 500 μm of ZVI-PCS on the substrate. The resulted ZVI-PCS had an internal coralloid-like channel structure therein, as shown in FIG. 3B.

Optionally, the aforementioned mixture can be only performed the dry-forming and functionalizing step to form a thickness of 1 μm to 1000 μm or 50 μm to 500 μm of ZVI-PCS film on the substrate. The resulted ZVI-PCS film had a flexible and dense nonporous structure (data not shown), and the ZVI-PCS film could further include the aforementioned heat dispersing materials.

In addition, before performing the forming and functionalizing step, the aforementioned mixture may be optionally coated onto the surface of the substrate uniformly by using conventionally blade coating or spin-on coating methods. As exemplified by the blade coating method, depending on what type of the blade coater was used, the mixture could be poured into a blade adjuster, and the coating thickness of the mixture may be adjusted by the height of the blade position. In an example, the height of the blade position may be set at 100 μm to 200 μm or other height rather than being limited thereto.

It is worth mentioning that, the aforementioned coating methods such as the blade coating or spin-on coating methods are well known to the artisan in this art rather than being recited in detail herein.

When an automatically continuous process performs the aforementioned steps, conveyor belts can transport the materials through a system to all the stages of the automatically continuous process, and the resulted ZVI-PCS can be separated from the underlying conveyor belt.

EXAMPLE 2

Evaluation of Controlling Hydrogen Releasing Effect of ZVI-PCS

EXAMPLE 2 is related to evaluate the prolonged hydrogen-releasing effect of the ZVI-PCS of EXAMPLE 1 immersed in the water-containing environment.

Figure 6:
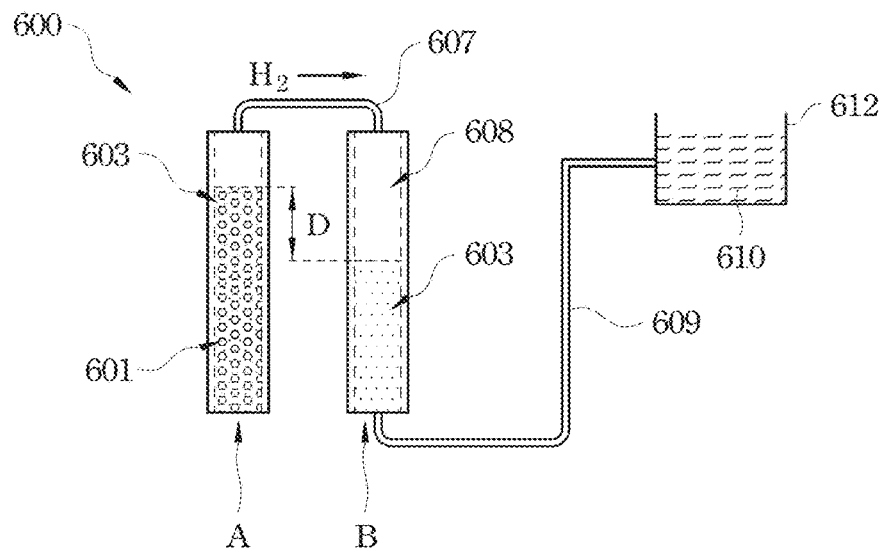
FIG. 6 depicts a schematic diagram of a setup for measuring released hydrogen from the ZVI-PCS of EXAMPLE 1.

Reference is made to FIG. 6, which depicts a schematic diagram of a measurement device for measuring hydrogen accumulation released from ZVI-PCS of EXAMPLE 1 according to the present invention. In this EXAMPLE, the measurement device 600 included a pair of a cartridge A and a cartridge B connected with each other in parallel through a tube 607. During measurement, a sample 601, such as ZVI powders or the ZVI-PCS of EXAMPLE 1, could be put into the cartridge A, and then water 603 was added into the cartridge A and the cartridge B to the same level (height) of water. When the sample 601 was immersed in the water 603 for a period, hydrogen gas ($H_2$) could be continuously generated and then pass through the tube 607 into a space 608 of the cartridge B. The accumulated hydrogen in the space 608 of the cartridge B pushed down on the water surface and drained the overflow water 610 through the tube 609 into a container 612, and the drained volume of the overflow water 610 was equivalent to the volume of the accumulated hydrogen, so that the water level of the cartridge A was higher than the water level of the cartridge B up to a distance D. An opening (unshown) of the tube 409 was connected to the container 612 and a little higher than the water level in the cartridge B. Hence, the released hydrogen gas could be measured in milliliters (mL) by daily recording the drained volume of the overflow water 610.

Figure 7:
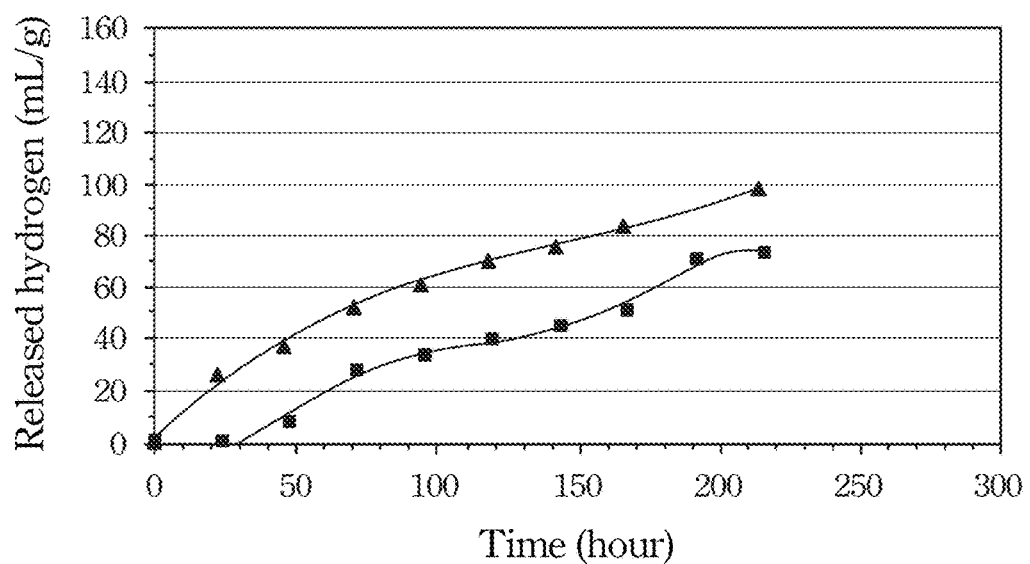
FIG. 7 depicts a curve diagram of released hydrogen amount of the ZVI-PCS immersed in the device of FIG. 6.

Reference is made to FIG. 7, which depicts a curve diagram of released hydrogen amount of ZVI-PCS immersed in the device of FIG. 6. In FIG. 7, the horizontal axis is referred to the immersion duration (hour) of the ZVI-PCS or bare ZVI powders, the vertical axis is referred to an accumulated amount of released hydrogen per gram of ZVI (mL/g), which is the volume of the overflowed water measured by the setup of FIG. 6 to the theoretically generated hydrogen. In FIG. 7, the symbol ▲ is referred to the released hydrogen accumulation of per gram of bare ZVI (mL/g), and the symbol ■ is referred to the released hydrogen accumulation of per gram of the ZVI-PCS (mL/g). The ZVI-PCS is granular and has a total weight of 1.13 g (containing 58 wt % of ZVIs).

According to the results in FIG. 7, the curves of the bare ZVIs (denoted as the symbol ▲) and the ZVI-PCS (denoted as the symbol ■) had a little similar trend of the released hydrogen accumulation. However, the bare ZVIs (denoted as the symbol ▲) had a released hydrogen amount (mL/g) higher than the ZVI-PCS (denoted as the symbol ■) because the bare ZVIs directly contacted water without the protection and control of the PCS (PESF) and the hydrogen gas was released very fast in a short period. In comparison with the bare ZVIs, the ZVI-PCS of EXAMPLE 1 (denoted as the symbol ■ of FIG. 7) could have a slowly and stably released hydrogen accumulation for more than 200 hours in the measurement device of FIG. 6, so as to enhance the growth of anaerobic microbes in the sewerage. Meanwhile, the ZVI-PCS could absorb and/or degrade pollutants and not affect the pH value of sewerage (data not shown).

Figure 8:
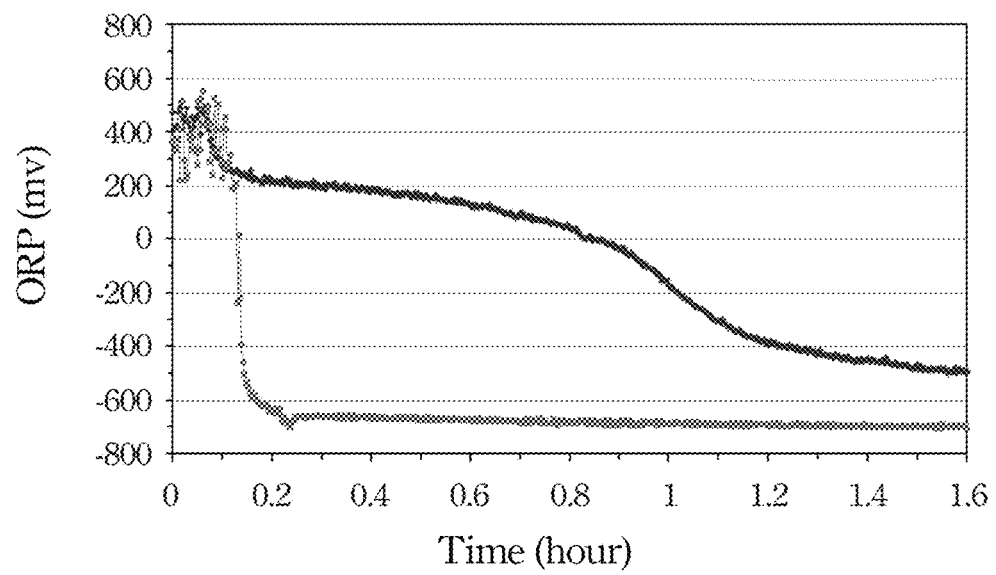
FIG. 8 depicts a curve diagram of oxidation-reduction potential of the ZVI-PCS.

Reference is made to FIG. 8, which depict a curve diagram of oxidation-reduction potential (ORP; mV) of the ZVI-PCS. In FIG. 8, the horizontal axis is referred to the immersed duration (hours) of the ZVI-PCS or bare ZVIs, and the vertical axis is referred to the measured ORP of the solution where the ZVI-PCS is immersed in the device of FIG. 6. In FIG. 8, the symbol ■ is referred to the ORP (mV) of per gram of the bare ZVIs, and the symbol ♦ is referred to the oxidation reduction potential (mV) of per gram of the ZVI-PCS. The ZVI-PCS is granular and has a total weight of 1.13 g (containing 58 wt % of ZVIs).

According to the results in FIG. 8, the bare ZVIs (denoted as the symbol ■) directly contacted water without the protection and control of the PCS (PESF), so that the measured ORP declined rapidly to reduction state and the hydrogen gas was released very fast in a short period of about 0.15 hour. In comparison with the bare ZVIs, the ZVI-PCS of EXAMPLE 1 released hydrogen slowly and stably in the measurement device of FIG. 6, so the ORP declined to reduction state until the hydrogen gas was released for more than 0.8 hour, as shown as the symbol ♦ of FIG. 8), so as to enhance the growth of anaerobic microbes in the sewerage.

Figure 9:
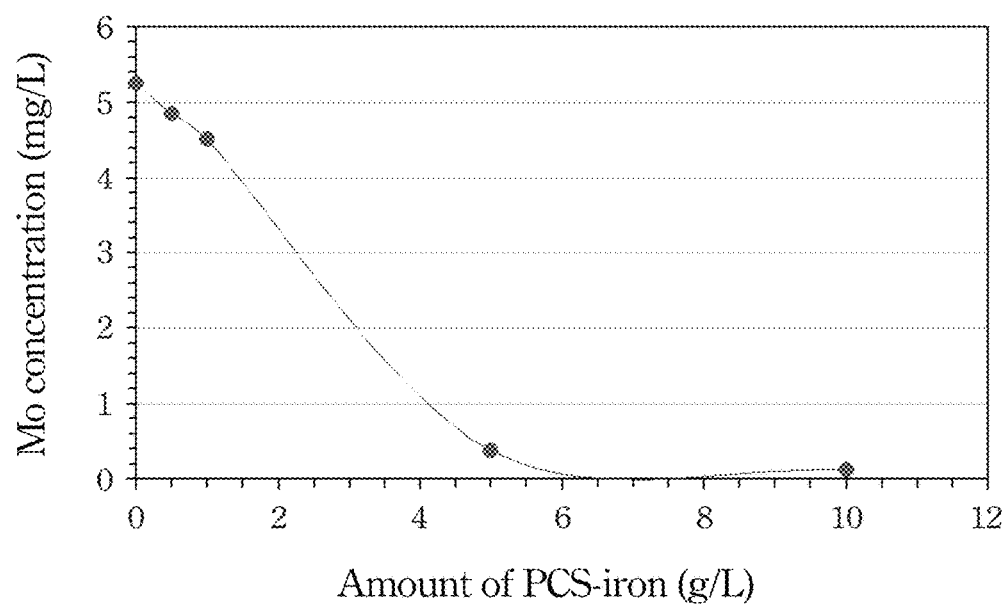
FIG. 9 depicts a curve diagram of molybdenum concentration of wastewater treated with the ZVI-PCS.

Reference is made to FIG. 9, which depict a curve diagram of molybdenum (Mo) concentration of Mo-containing wastewater treated by the ZVI-PCS according to an embodiment of the present invention. In FIG. 9, the horizontal axis is referred to the amount (g/L) of the ZVI-PCS, and the vertical axis is referred to the Mo concentration (mg/L) of the wastewater. The test method can be referred to "Inductively coupled plasma-mass spectrum method (NIEA W313) for monitoring metals and trace elements in the water" announced by Environmental Protection Administration Taiwan or other conventional test methods. The details of monitoring Mo concentration in water are well known by the artisan in this art rather than being recited in detail herein.

According to the results in FIG. 9, the more ZVI-PCS was added into the Mo-containing wastewater, the less Mo concentration would be existed in the Mo-containing wastewater. The result was evidenced that the ZVI-PCS can effectively absorb the heavy metal Mo in the wastewater.

Figure 10A:
FIGS. 10A to 10C show scanning electron microscopy image (FIG. 10A), energy dispersive spectrometry spectrum (FIG. 10B) and element line scanning (FIG. 10C) of the ZVI-PCS after treating wastewater.
Figure 10B:
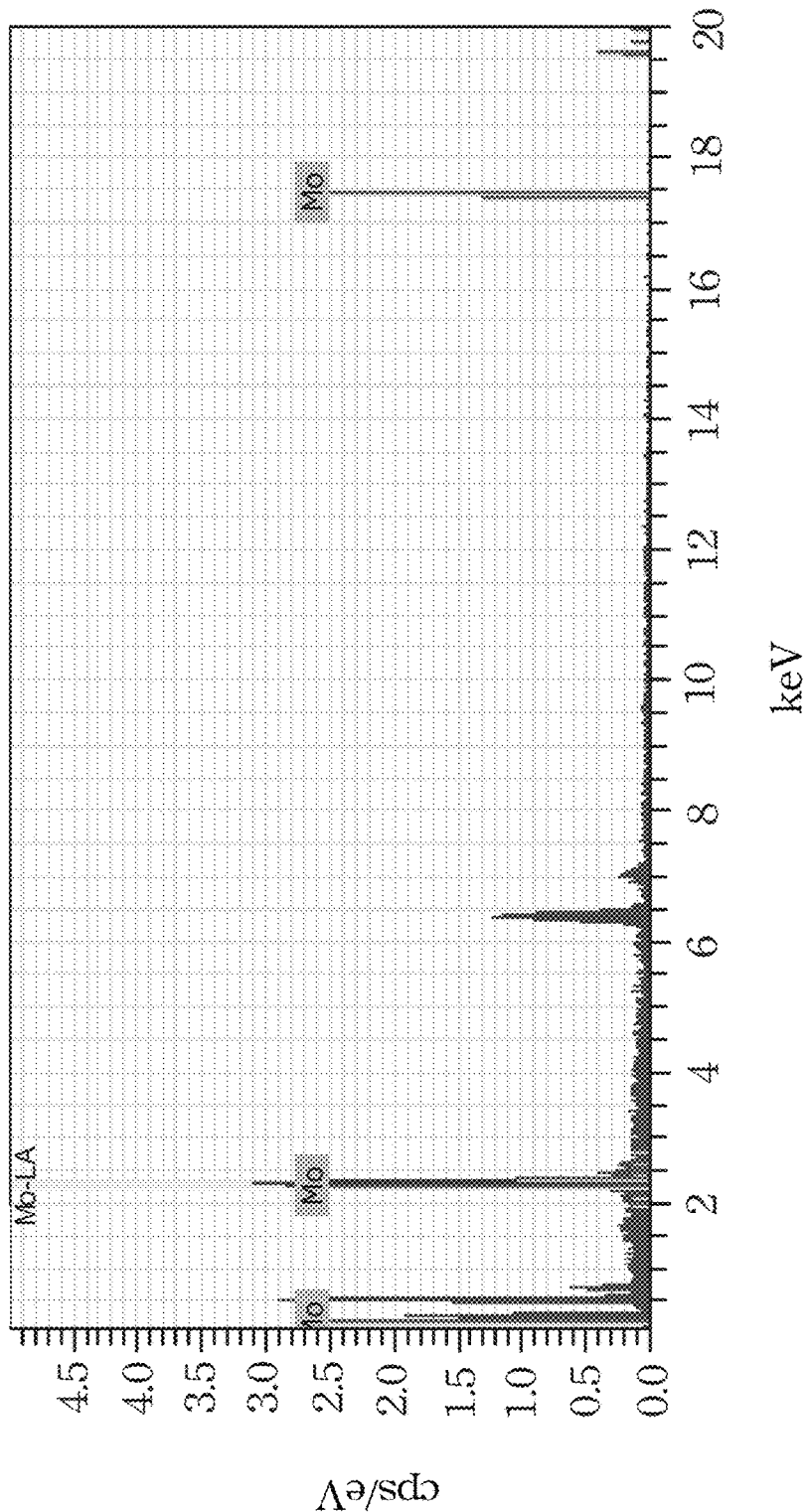
Figure 10C:
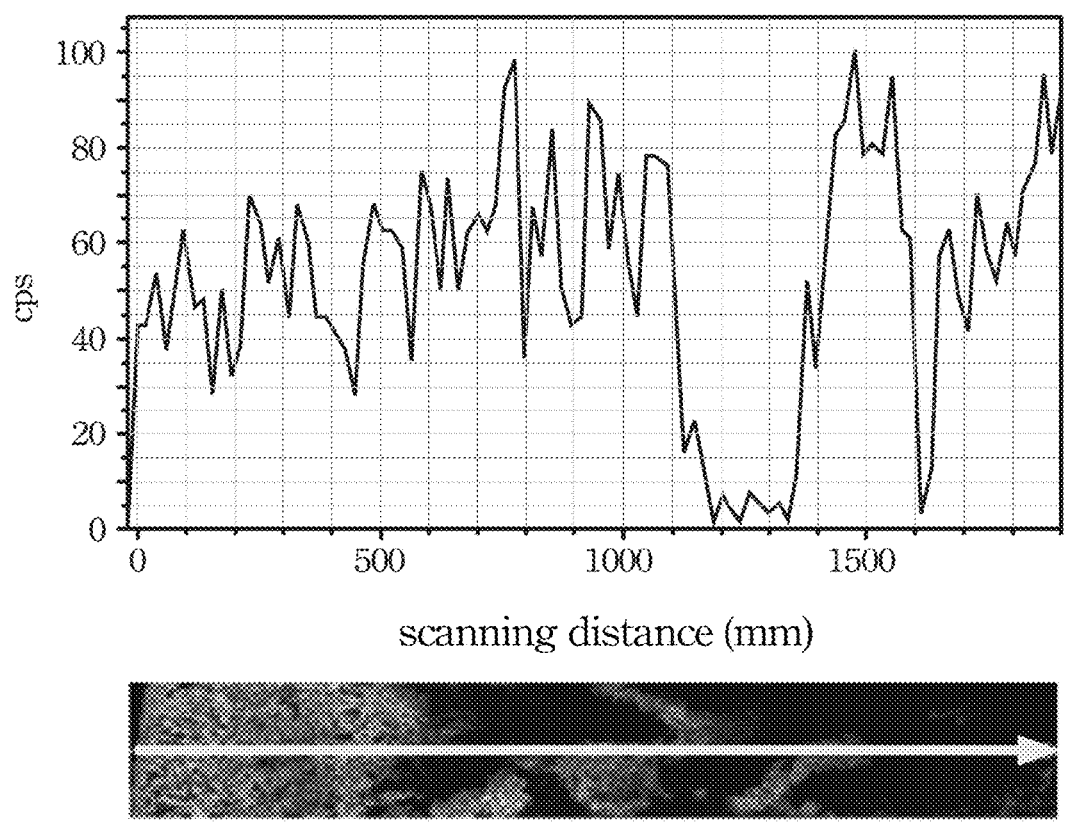

Reference is made to FIGS. 10A to 10C, which show a scanning electron microscopy image of the internal structure (FIG. 10A), an energy dispersive spectrometry (EDS) image (FIG. 10B) and an element line scanning image (FIG. 10C) of the ZVI-PCS after treating the Mo-containing wastewater according to an embodiment of the present invention, respectively, all of which is analyzed by high-resolution transmission electron microscopy (HR-TEM)—energy dispersive spectrometer (EDS) (Model No. JEM-2100F, JEOL Co.). The white arrows in FIGS. 10A and 10C are referred to the scanning direction and distance from the surface to the core of the ZVI-PCS of an embodiment of the present invention. FIGS. 10B and 10C are the results of Mo distributed on the ZVI-PCS surface.

According to the result of FIG. 10B, the element Mo was distributed on the surface of the ZVI-PCS of an embodiment of the present invention. Moreover, the result of FIG. 10C revealed that the internal coralloid-like channel structure in the ZVI-PCS can absorb the heavy metal Mo, thereby decreasing Mo concentration in the wastewater.

In other embodiments, when the permeable reactive barrier made of the ZVI-PCS is disposed in the wastewater treatment equipment of a semiconductor fabrication plant for more than one month, pollutants in the wastewater can be absorbed and/or degraded without changing pH value of the overflowed wastewater in the sewage (data not shown).

In addition, in other embodiments, a nonporous film can be further manufactured by the ZVI-PCS for shielding electromagnetic waves (data not shown).

In addition, it should be supplemented that, specific iron-containing materials and derivatives thereof, specific polymeric materials, specific polymeric carriers, specific reaction conditions, specific substrates, specific apparatuses or specific water-containing environments are exemplified in the present invention for clarifying the ZVM-PCS of the present invention; however, as is understood by a person skilled in the art, other iron-containing materials and derivatives thereof, other polymeric carriers, other reaction conditions, other substrates, other apparatuses or other water-containing environments can be also used in the production of the ZVM-PCS of the present invention, rather than limiting thereto.

According to the embodiments of the present invention, the aforementioned ZVM-PCS and manufacturing method thereof, they advantageously include that the internal coralloid-like channel structure of PCS can be tunable to accommodate high amount of the iron-containing materials and derivatives thereof and control the hydrogen-releasing rate. The surface pore size, porosity, hydrophilicity, and internal coralloid-like channel structure of PCS can be tailored through the manufacturing process, so that PCS can be functioned as a regulator for the releasing of produced hydrogen, and also control the adsorption and reduction reactions toward heavy metals and chlorinated volatile organic compounds in water. The released hydrogen from the ZVM-PCS can enhance the growth and metabolism of anaerobic organisms in the water-containing environment. Moreover, the ZVM-PCS can be developed as the filter materials that can be installed in a column or any storage for water and wastewater treatment, or even in a groundwater cut-off barrier for the cleanup of contamination. While the ZVM-PCS is synthesized as a film without surface openings, it can be used as the EMI shielding material.

As is understood by a person skilled in the art, the foregoing embodiments of the present invention are illustrated of the present invention rather than limiting of the present invention. It is intended to cover various modifications and similar arrangements included within the spirit and scope of the appended claims. Therefore, the scope of which should be accorded the broadest interpretation so as to encompass all such modifications and similar structure.

What is claimed is:

1. A method for manufacturing zerovalent metal-polymer complex supporter (ZVM-PCS), comprising:
    preparing a mixture, wherein the mixture comprises:
        more than 80 parts to 92 parts by weight of iron-containing materials and derivatives thereof, wherein the iron-containing materials and derivatives thereof consists of zero-valent irons and metals coated on the zero-valent irons, the metals are selected from the group consisting of platinum, palladium, rhodium, gold, silver, cobalt and any combination thereof, and the iron-containing materials and derivatives thereof have an averaged diameter from 1 nm to 10 µm; and
        8 parts to less than 20 parts by weight of polymer complex supporter, wherein the polymer complex supporter is selected from the group consisting of sulfone polymers or fluorine-containing polymers based on a total weight of the iron-containing materials and derivatives thereof and the polymer complex supporter in the mixture as 100 parts; and
        an organic solvent to dissolve the polymer complex supporter and to disperse the iron-containing materials and derivatives thereof uniformly wherein the organic solvent is selected from the group consisting of N,N-dimethyl formamide (DMF), 1-methyl 2 pyrrolidione (NMP) and N, N-dimethylacetamide (DMAc);
    conducting a vacuuming step to remove air bubbles in the mixture; and
    conducting a forming and functionalizing step, wherein the forming and functionalizing step comprises:
        performing a wet-forming and functionalizing step, wherein the mixture is performed in a coagulating solvent in a temperature range from 0° C. to 40° C. for 0.5 minute to 5 minutes for making the mixture swollen in the coagulating solvent and removing part of the organic solvent and forming a complex, wherein the coagulating solvent is selected from the group consisting of methanol, ethanol, propanol, acetone, water and any combination thereof; and
        performing a dry-forming and functionalizing step, to keep the composite material to be dried in a temperature of 90° C. to 150° C. for 15 minutes to 30 minutes, so as to remove a residue of the organic solvent and the coagulant and to form the ZVM-PCS that accommodates the iron-containing materials and derivatives thereof, the PCS possesses an internal coralloid-like channel structure and surface pores with an averaged pore size from 1 nm to 100 µm the ZVM-PCS has a thickness of 1 µm to 1000 µm.

2. The method for manufacturing ZVM-PCS according to claim 1, wherein the mixture further comprises an absorbent material, an amount of the absorbent materials in the ZVM-PCS is 0.01 part to 35 parts by weight, and the absorbent material is selected from the group consisting of activated carbon, zeolite, molecular sieve and any combination thereof.

3. The method for manufacturing ZVM-PCS according to claim 1, wherein the mixture further comprises a heat dispersing material, an amount of the heat dispersing material in the ZVM-PCS is 0.01 part to 35 parts by weight, and the heat dispersing material is selected from the group consisting of boron nitride, carbon nanotubes and any combination thereof.

4. The method for manufacturing ZVM-PCS according to claim 1, wherein the mixture further comprises a bionutrient, an amount of the bionutrients in the ZVM-PCS is 0.01 part to 35 parts by weight, and the bionutrients is selected from the group consisting of sugar, starch, phosphate and any combination thereof.

5. The method for manufacturing ZVM-PCS according to claim 1, wherein the mixture further comprises a dispersant, an amount of the dispersant in the ZVM-PCS is 0.1 part to 2 parts by weight, and the dispersant is selected from the group consisting of polycarbonate, polyvinyl alcohol, polyacrylamide and any combination thereof.

6. The method for manufacturing ZVM-PCS according to claim 1, wherein the ZVM-PCS has a flake-like, granule-like, a hollow tube-like or a rod-like shape.

7. The method for manufacturing ZVM-PCS according to claim 1, further comprising:
   after the vacuuming step but before the forming and functionalizing step, conducting a coating step to keep the mixture being formed on a substrate, wherein the coating step is a spin-on coating step or a blade coating step.

8. The method for manufacturing ZVM-PCS according to claim 1, wherein the ZVM-PCS is shaped as a thin film, a granule, a hollow tube or a rod.

9. The method for manufacturing ZVM-PCS according to claim 1, wherein the vacuuming step is performed for 10 minutes to 30 minutes.

10. The method for manufacturing ZVM-PCS according to claim 1, wherein the method for manufacturing the ZVM-PCS is performed in a batch process or an automatically continuous process.

11. The method for manufacturing ZVM-PCS according to claim 1, wherein the PCS possesses an internal coralloid-like channel structure and a porous surface with an averaged pore size from 1 nm to 100 μm, and as the ZVM-PCS is immersed in a water-containing environment, water molecules and pollutants can diffuse into the internal coralloid-like channel structure through the surface pores and then contact with the iron-containing materials and derivatives thereof, so as to adsorb and/or degrade the pollutants and continuously release out hydrogen through the surface pores, thereby enhancing anaerobic bioremediation process in the water-containing environment.

12. The method for manufacturing ZVM-PCS according to claim 11, wherein the water-containing environment refers to ocean, river, lake, sewerage, ditch, aquifer, cistern, sludge or soil.

13. The method for manufacturing ZVM-PCS according to claim 11, wherein the pollutants is heavy metal pollutants, organohalogen compounds or nitrates, and the heavy metal pollutants comprises arsenic or chromium, and the organohalogen compounds comprises chlorinated volatile organic compounds (CVOCs), trichloroethylene (TCE), perchloroethylene (PCE) or dioxins.

* * * * *